(12) United States Patent
Sudou (10) Patent No.: US 9,941,682 B2
(45) Date of Patent: Apr. 10, 2018

(54) TERMINAL-EQUIPPED WIRE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Hiroshi Sudou, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/533,588

(22) PCT Filed: Dec. 4, 2015

(86) PCT No.: PCT/JP2015/084169
§ 371 (c)(1),
(2) Date: Jun. 6, 2017

(87) PCT Pub. No.: WO2016/093171
PCT Pub. Date: Jun. 16, 2016

(65) Prior Publication Data
US 2017/0338640 A1    Nov. 23, 2017

(30) Foreign Application Priority Data

Dec. 9, 2014  (JP) ................................. 2014-248749

(51) Int. Cl.
*H01R 9/05* (2006.01)
*H02G 15/04* (2006.01)
*H01R 4/72* (2006.01)

(52) U.S. Cl.
CPC ............... *H02G 15/04* (2013.01); *H01R 4/72* (2013.01)

(58) Field of Classification Search
CPC .......... H02G 3/02; H02G 9/05; H02G 15/013; H02G 15/02; H02G 15/04; H02G 15/08;
(Continued)

(56) References Cited

U.S. PATENT DOCUMENTS 2,939,905 A  *  6/1960  Canfield ................... H01B 7/04
                                                  174/113 C
5,644,189 A  *  7/1997  Busby ....................... H01K 1/44
                                                   313/318.01
(Continued)

FOREIGN PATENT DOCUMENTS

JP         11-233175 A    *  8/1999    ............... H01R 4/72
JP       2000285983 A       10/2000
(Continued)

OTHER PUBLICATIONS

International Search Report and Written Opinion for Application No. PCT/JP2015/084169 dated Jan. 26, 2016, 5 pages.
(Continued)

*Primary Examiner* — William H Mayo, III
(74) *Attorney, Agent, or Firm* — Reising Ethington, P.C.

(57) ABSTRACT

A terminal-equipped wire is provided with an insulated wire including a core and an insulation coating covering the periphery of the core, a terminal including a wire connecting portion connected to the insulated wire, a heat shrinkable tube configured to cover the periphery of the wire connecting portion while being shrunk by receiving heat, and a sheet-like intervening member provided between the heat shrinkable tube and the terminal.

5 Claims, 5 Drawing Sheets (58) Field of Classification Search
CPC ... H01R 4/02; H01R 4/18; H01R 4/28; H01R 4/62
USPC ... 174/74 R, 77 R, 75 R, 76, 78, 84 R, 84 S, 174/88 R, 92, 93, 94; 439/587, 730
See application file for complete search history.

(56) References Cited

U.S. PATENT DOCUMENTS

| | | | | |
|---|---|---|---|---|
| 7,211,731 | B2* | 5/2007 | Nagamine | H01R 13/5205 174/74 R |
| 7,572,979 | B2* | 8/2009 | Otsuki | H01R 13/5213 174/84 R |
| 2010/0120072 | A1* | 5/2010 | Lorence | G01N 33/57415 435/7.23 |
| 2011/0045697 | A1* | 2/2011 | Sawamura | B60R 16/0207 439/587 |

FOREIGN PATENT DOCUMENTS

| | | |
|---|---|---|
| JP | 2009230998 A | 10/2009 |
| JP | 2014107072 A | 6/2014 |

OTHER PUBLICATIONS

International Search Report for Application No. PCT/JP2015/084169 dated Dec. 1, 2016, 3 pages.

\* cited by examiner

TERMINAL-EQUIPPED WIRE

CROSS REFERENCE TO RELATED APPLICATIONS

This application claims the priority of Japanese patent application JP2014-248749 filed on Dec. 9, 2014, the entire contents of which are incorporated herein.

TECHNICAL FIELD

The present invention relates to a water stop structure of a terminal-equipped wire including an insulated wire and a terminal mounted on the insulated wire.

BACKGROUND ART

In a wiring harness to be installed in a vehicle such as an automotive vehicle, a terminal-equipped wire includes an insulated wire and a terminal mounted on the insulated wire.

Further, the terminal-equipped wire may further include a tube-like member covering a connected part of the insulated wire and the terminal.

For example, in an example shown in patent literature 1 (JP2000-285983), a terminal-equipped wire includes a heat shrinkable type tube (hereinafter, "heat shrinkable tube") configured to cover a connected part of an insulated wire and a terminal.

SUMMARY

In a terminal-equipped wire including a heat shrinkable tube which shrinks by receiving heat, a relatively large load is exerted to a part of the heat shrinkable tube in contact with a corner of the terminal. Thus, such as when the heat shrinkable tube is provided at a location where temperature drastically changes, the part of the heat shrinkable tube in contact with the corner of the terminal may be broken.

The present design aims to more simply suppress the breakage of a heat shrinkable tube in a terminal-equipped wire including the heat shrinkable tube.

A terminal-equipped wire according to a first aspect includes an insulated wire including a core and an insulation coating covering the periphery of the core, a terminal including a wire connecting portion connected to the insulated wire, a heat shrinkable tube configured to cover the periphery of the wire connecting portion while being shrunk by receiving heat, and a sheet-like intervening member provided between the heat shrinkable tube and the terminal.

A terminal-equipped wire according to a second aspect is one mode of the terminal-equipped wire according to the first aspect. The terminal-equipped wire according to the second aspect further includes an adhesive provided on an inner side of the heat shrinkable tube and configured to fill up clearances between the heat shrinkable tube and the terminal, the insulated wire.

A terminal-equipped wire according to a third aspect is one mode of the terminal-equipped wire according to the first or second aspect. In the terminal-equipped wire according to the third aspect, the sheet-like intervening member is provided to cover the periphery of the terminal.

A terminal-equipped wire according to a fourth aspect is one mode of the terminal-equipped wire according to any one of the first to third aspects. In the terminal-equipped wire according to the fourth aspect, the intervening member includes a member made of fabric.

A terminal-equipped wire according to a fifth aspect is one mode of the terminal-equipped wire according to any one of the first to fourth aspects. In the terminal-equipped wire according to the fifth aspect, the wire connecting portion of the terminal includes a coating connecting portion configured to cover the periphery of an end part of the insulation coating and to be crimped to the end part of the insulation coating, the intervening member covers the periphery of the coating connecting portion, and the heat shrinkable tube covers the periphery of the intervening member covering the periphery of the coating connecting portion.

In each of the above aspects, since the sheet-like intervening member is provided between the heat shrinkable tube and the terminal, direct contact of the heat shrinkable tube with corners of the terminal can be suppressed. In this case, the breakage of the heat shrinkable tube can be suppressed by a simple operation of providing the sheet-like intervening member at a location of the terminal that might cause the breakage of the heat shrinkable tube.

Further, in the second aspect, the adhesive is further provided which is provided on the inner side of the heat shrinkable tube and fills up the clearances between the heat shrinkable tube and the terminal, the insulated wire. In this case, the water stopping performance of this terminal-equipped wire is improved.

In the third aspect, the sheet-like intervening member is provided to cover the periphery of the terminal. In this case, the sheet-like intervening member can be provided in an area relatively wide in a circumferential direction and the location of the terminal that might cause the breakage of the heat shrinkable tube can be more reliably covered with the intervening member. Thus, the breakage of the heat shrinkable tube can be more suppressed.

In the fourth aspect, the intervening member includes the member made of fabric. In this case, the breakage of the heat shrinkable tube due to contact with a corner of the terminal can be more suppressed by the relatively flexible and thick intervening member.

In the fifth aspect, the wire connecting portion of the terminal includes the coating connecting portion configured to cover the periphery of the end part of the insulation coating and to be crimped to the end part of the insulation coating. Further, the heat shrinkable tube covers the periphery of the intervening member covering the periphery of the coating connecting portion. At this time, the coating connecting portion is a part having a relatively large contour out of a part of the terminal-equipped wire covered with the heat shrinkable tube. Thus, a load received due to the contact of the heat shrinkable tube with a corner of the coating connecting portion can be suppressed by providing the intervening member between the coating connecting portion and the heat shrinkable tube. In this way, the breakage of the heat shrinkable tube due to contact with the corner of the terminal can be effectively suppressed.

EMBODIMENTS OF INVENTION

Hereinafter, embodiments are described with reference to the accompanying drawings. The following embodiments are specific examples of the present design and not intended to limit the technical scope of the present invention.

First Embodiment

A terminal-equipped wire 100 according to a first embodiment is described with reference to FIGS. 1 to 3. The terminal-equipped wire 100 includes an insulated wire 8, a terminal 7, a heat shrinkable tube 6 and an intervening member 5. In this embodiment, the terminal-equipped wire 100 further includes an adhesive 4 provided inside the heat shrinkable tube 6. The terminal-equipped wire 100 is, for example, installed in a vehicle such as an automotive vehicle.

Figure 1:
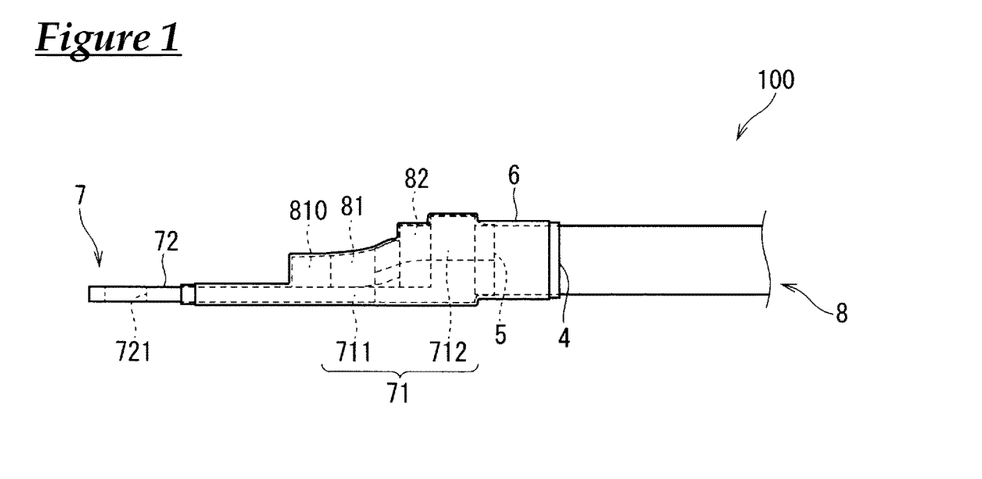
FIG. 1 is a side view of a terminal-equipped wire according to a first embodiment.

FIG. 1 is a side view of the terminal-equipped wire 100. FIG. 2 is a side view partly in section showing a part of a manufacturing process of the terminal-equipped wire 100. A process of shrinking the heat shrinkable tube 6 is shown in FIG. 2. FIG. 3 is a partially exploded front view of the terminal-equipped wire 100. The terminal-equipped wire 100 including the heat shrinkable tube 6 before shrinkage is shown in FIG. 3.

Figure 2:
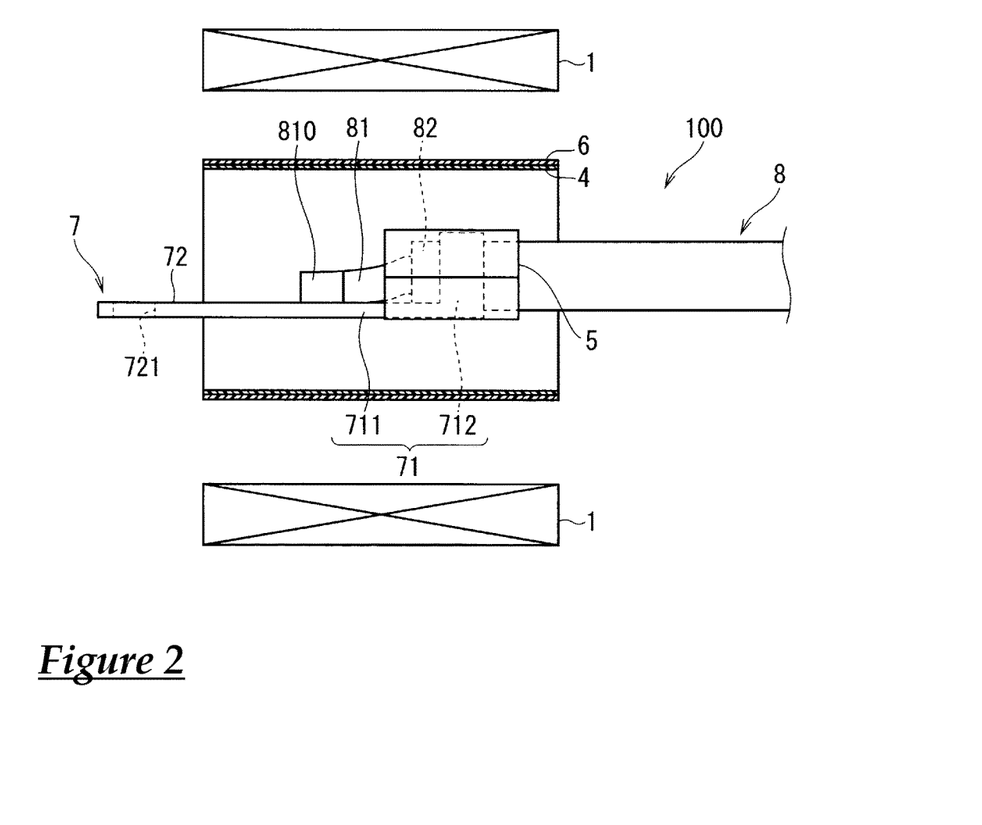
FIG. 2 is a side view partly in section showing a part of a manufacturing process of the terminal-equipped wire according to the first embodiment.
Figure 3:
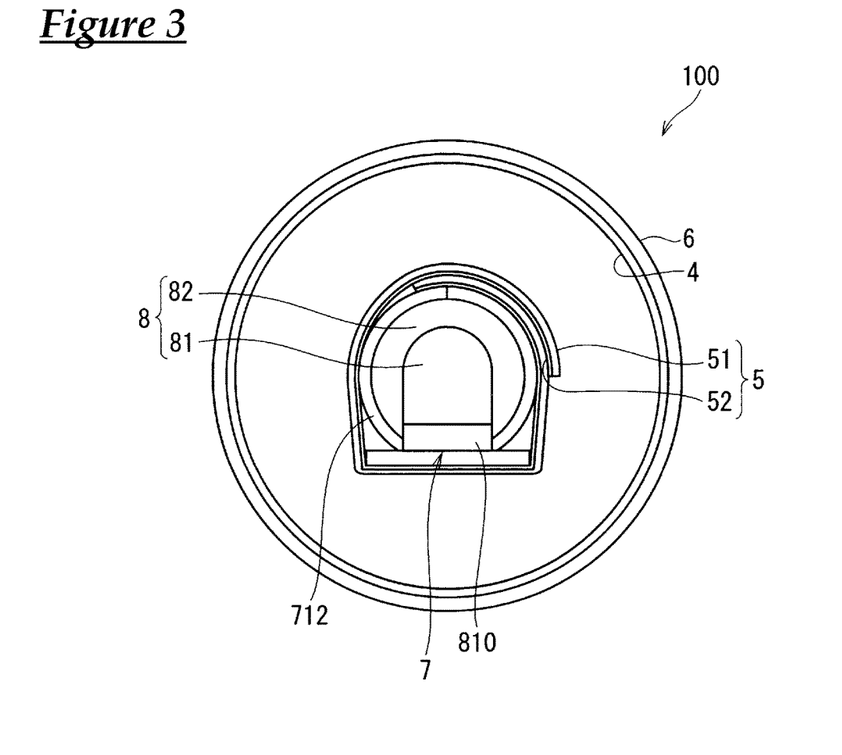
FIG. 3 is a partially exploded front view of the terminal-equipped wire according to the first embodiment.

As shown in FIGS. 1 and 2, the insulated wire 8 includes a core 81 and an insulation coating 82 covering the periphery of the core 81 in the terminal-equipped wire 100. In this embodiment, the insulation coating 82 at an end part of the insulated wire 8 is removed to expose the core 81 of the end part of the insulated wire 8. The terminal 7 to be described later is connected to this exposed core 81.

In the insulated wire 8, the core 81 is, for example, thought to be a member mainly containing metal such as copper or aluminum. Further, the insulation coating 82 is, for example, thought to be a synthetic resin member mainly containing polyethylene, vinyl chloride or the like.

The terminal 7 includes a wire connecting portion 71 connected to the insulated wire 8. In this embodiment, the wire connecting portion 71 includes a core connecting portion 711 connected to the core 81 extending out from the insulation coating 82 in the insulated wire 8 and a coating connecting portion 712 connected to an end part of the insulation coating 82.

Further, in this embodiment, the terminal 7 further includes a contact portion 72 connectable to a mating member serving as a connection partner of this terminal 7.

In this embodiment, the core connecting portion 711 in the wire connecting portion 71 is in the form of a flat plate. As shown in FIG. 2, the core 81 extending out from the insulation coating 82 is connected to the core connecting portion 711 by welding such as ultrasonic welding or heat welding. In this way, the core connecting portion 711 and the core 81 are electrically or physically connected. Note that a part of the core 81 of the insulated wire 8 welded to the core connecting portion 711 is called a welded portion 810.

Note that the core connecting portion 711 may be possibly connected to the core 81 of the insulated wire 8 by crimping. In this case, the core connecting portion 711 is thought to include crimping pieces to be crimped to cover the periphery of the core 81 extending out from the insulation coating 82.

Further, in this embodiment, the coating connecting portion 712 in the wire connecting portion 71 covers the periphery of the end part of the insulation coating 82 and is crimped to the end part of the insulation coating 82. As shown in FIG. 2, in this embodiment, the coating connecting portion 712 includes crimping pieces crimped to cover the periphery of the end part of the insulation coating 82. By crimping the crimping pieces of the coating connecting portion 712 to the end part of the insulation coating 82, the coating connecting portion 712 and the insulation coating 82 are physically connected.

Further, in this embodiment, the contact portion 72 is formed to be continuous with the wire connecting portion 71. In this embodiment, the contact portion 72 is formed to be continuous with the wire connecting portion 71 in an extending direction of the insulated wire 8. Specifically, the contact portion 72 and the wire connecting portion 71 are formed side by side on one straight line. However, the contact portion 72 may be possibly formed to project on one end part of the wire connecting portion 71 in a direction perpendicular to the extending direction of the insulated wire 8.

Further, in this embodiment, the contact portion 72 includes a fastening hole 721 enabling bolt-fastening to the mating member. The fastening hole 721 is a through hole penetrating from one principal surface to the other principal surface of the terminal 7. In this case, the mating member may be also possibly formed with a fastening hole enabling bolt-fastening to the terminal 7. The terminal 7 and the mating member are thought to be connected by inserting and fastening the bolt with the fastening hole 721 of the contact portion 72 of the terminal 7 and the fastening hole of the mating member overlapped.

In the terminal-equipped wire 100, the intervening member 5 is a sheet-like member provided between the heat shrinkage tube 6 to be described later and the terminal 7. The intervening member 5 is a bendable member. The intervening member 5 is provided at a location of the terminal 7 that may break the heat shrinkage tube 6 upon being contacted by the heat shrinkage tube 6. Such a location is, for example, thought to be a part of the terminal 7 formed to be pointed toward an outer peripheral side such as a corner part of the terminal 7.

In this embodiment, the intervening member 5 is provided to cover the periphery of the terminal 7. Specifically, the intervening member 5 covers at least a partial area in a circumferential direction of the terminal 7. Note that a case where the intervening member 5 covers the periphery of the terminal 7 over the entire circumference as shown in FIGS. 1 to 3 is shown in this embodiment.

The intervening member 5 is thought to be a member configured to cover the periphery of the wire connecting portion 71. In this embodiment, the intervening member 5 covers the periphery of the coating connecting portion 712. Specifically, in this embodiment, the intervening member 5 covers the periphery of the coating connecting portion 721 covering the periphery of the insulation coating 82 over the entire circumference.

Note that, as shown in FIGS. 1 and 2, the intervening member 5 covers the peripheries of the end part of the insulation coating 82, the entire coating connecting portion 712, a part of the core 81 extending out from the insulation coating 82 and a part of the core connecting portion 711, but does not cover the welded portion 810 in this embodiment. However, the intervening member 5 may possibly further cover the welded portion 810 or cover every part other than the contact portion 72 at the end part of the terminal-equipped wire 100.

Further, in this embodiment, the intervening member 5 includes a member made of fabric. Further, as shown in FIG. 3, the intervening member 5 is a tape-like member having a two-layer structure including a first layer 51 formed of a fabric member and a second layer 52 including an adhesive capable of bonding the first layer 51 to the terminal 7. In the terminal-equipped wire 100, the second layer 52 is a layer of the intervening member 5 on the side of the terminal 7 and the insulated wire 8. Specifically, in the terminal-equipped wire 100, an outer layer of the intervening member 5 is the first layer 51 and the layer of the intervening member 5 on the side of the terminal 7 and the insulated wire 8, i.e. an inner layer is the second layer 52.

The first layer 51 in the intervening member 5 includes a sheet-like fabric member. The fabric member constituting the first layer 51 is, for example, thought to be a member containing fibers such as acetate fibers or polyether fibers. Further, the first layer 51 may possibly be a fiber woven fabric or a nonwoven fabric.

Further, the second layer 52 in the intervening member 5 is provided on the inner side surface of the first layer 51. In this embodiment, the second layer 52 is provided over the entire inner side surface of the first layer 51. However, the second layer 52 may be possibly provided in a spot-like manner on the inner side surface of the first layer 51. The second layer 52 is, for example, thought to be a layer of an adhesive such as an acrylic-based adhesive, rubber-based adhesive or silicone-based adhesive.

In this embodiment, one end part of the intervening member 5 is first bonded to the outer peripheral surface of the coating connecting portion 712 of the terminal 7 by the second layer 52 with the terminal 7 and the insulated wire 8 connected. Then, the intervening member 5 is wound along the circumferential direction of the terminal 7. In this way, the intervening member 5 can be obtained which covers the periphery of the coating connecting portion 712 over the entire circumference. Note that, in this case, a part of the intervening member 5 may overlap as shown in FIG. 3. In an example shown in FIG. 3, the second layer 52 of the other end part of the intervening member 5 is bonded to the outer side surface of the first layer 51 of the intervening member 5 present inside this part. As shown in FIG. 3, if the intervening member 5 is wound and mounted on the terminal 7, a part of the terminal 7 pointed toward the outer peripheral side can be reliably covered with the intervening member 5 and the breakage of the heat shrinkage tube 6 can be more reliably suppressed.

In the terminal-equipped wire 100, the heat shrinkable tube 6 covers the periphery of the wire connecting portion 71 while being shrunk by receiving heat. More specifically, the heat shrinkage tube 6 covers the periphery of the wire connecting portion 71 to seal the welded portion 810, which is a connected part of the core 81 of the insulated wire 8 and the terminal 7. Further, in this embodiment, the terminal-equipped wire 100 further includes the adhesive 4 provided on an inner side of the heat shrinkage tube 6.

In the terminal-equipped wire 100, the adhesive 4 fills up clearances between the heat shrinkage tube 6 and the terminal 7, the insulated wire 8. Specifically, the adhesive 4 is provided entirely between the heat shrinkage tube 6 and the insulated wire 8, the terminal 7.

In this embodiment, the adhesive 4 is formed on the inner surface of the heat shrinkage tube 6 before shrinkage as shown in FIG. 2. Specifically, the heat shrinkage tube 6 having a layer of the adhesive 4 formed on the inner side is heated and shrunk, whereby the wire connecting portion 71 of the terminal 7 is covered with the heat shrinkage tube 6.

The heat shrinkage tube 6 is, for example, a tubular member made of synthetic resin such as polyolefin-based, nylon-based, silicone-based, fluororesin-based or polyester elastomer-based synthetic resin. The heat shrinkage tube 6 is obtained by cooling a resin member molded into a very thin tube by extrusion after the resin member is stretched into a thick tube in a heated state. The thus obtained heat shrinkage tube 6 has shape memory characteristics of being shrunk to become the thin tube before stretching, when being heated.

The adhesive 4 is, for example, thought to be a thermoplastic material such as a modified olefin- or polyester-based hot melt adhesive.

The heat shrinkage tube 6 in the terminal-equipped wire 100 is obtained by heating the heat shrinkage tube 6 before shrinkage by a heating device 1 such as a heater. In this embodiment, a temperature at which the heat shrinkage tube 6 before shrinkage is heated is a temperature at which the heat shrinkage tube 6 shrinks and the adhesive 4 provided on the inner side of the heat shrinkage tube 6 melts. In this case, the adhesive 4 changes into a liquid state and the heat shrinkage tube 6 adheres to the terminal 7 and the insulated wire 8 at the same time as the heat shrinkage tube 6 is heated and shrunk. By finishing a heating operation of the heat shrinkage tube 6 and cooling the heat shrinkage tube 6, the adhesive 4 in the liquid state is solidified and the clearances between the heat shrinkage tube 6 and the terminal 7, the insulated wire 8 are filled up by the solidified adhesive 4.

Note that, in this embodiment, part of the adhesive 4 extrudes from an end part of the heat shrinkage tube 6 in the terminal-equipped wire 100 as shown in FIG. 1. However, the adhesive 4 may be possibly entirely accommodated inside the heat shrinkage tube 6 in the terminal-equipped wire 100.

Next, a manufacturing process of the terminal-equipped wire 100 of this embodiment is described. In this embodiment, a connecting operation of the terminal 7 and the insulated wire 8 is first performed. Then, the sheet-like intervening member 5 is wound to cover the coating connecting portion 712 of the wire connecting portion 71 of the terminal 7 after the connecting operation. Thereafter, as shown in FIG. 3, the wire connecting portion 71 of the terminal 7 having the intervening member 5 wound therearound is passed through the heat shrinkage tube 6 before shrinkage and the heat shrinkage tube 6 is heated by the heating device 1, whereby the heat shrinkage tube 6 covering the periphery of the wire connecting portion 71 in a shrunk state can be obtained. Note that, in this embodiment, the heat shrinkage tube 6 after shrinkage is bonded to the outer peripheral surfaces of the terminal 7 and the insulated wire 8 by the adhesive 4.

Since the sheet-like intervening member 5 is provided between the heat shrinkage tube 6 and the terminal 7 in the terminal-equipped wire 100 obtained via the above process, it can be suppressed that the heat shrinkage tube 6 directly contacts corners of the terminal 7. In this case, the breakage of the heat shrinkage tube 6 can be suppressed by a simple operation of providing the sheet-like intervening member 5 at a location of the terminal 7 that may cause the breakage of the heat shrinkage tube 6. As a result, the durability of a water stop structure by the heat shrinkage tube 6 in the terminal-equipped wire 100 is improved.

Further, in this embodiment, the sheet-like intervening member 5 is applicable, for example, also when the shape of a terminal, a thickness of an insulated wire and the like in a terminal-equipped wire differ. Specifically, the sheet-like intervening member 5, which is not a special article for one terminal-equipped wire 100, is excellent in general versatility, and the breakage of the heat shrinkage tube 6 can be suppressed by the sheet-like intervening member 5 excellent in general versatility. Thus, manufacturing cost of the terminal-equipped wire 100 can be suppressed in this embodiment.

Further, in this embodiment, the adhesive 4 is further provided which is provided on the inner side of the heat shrinkage tube 6 and fills up the clearances between the heat shrinkage tube 6 and the terminal 7, the insulated wire 8. In this case, the water stopping performance of the terminal-equipped wire 100 is improved since the intrusion of liquid through the clearances between the heat shrinkage tube 6 covering the welded portion 810 and the terminal 7, the insulated wire 8 can be more reliably suppressed.

Further, in this embodiment, the terminal-equipped wire 100 includes the sheet-like intervening member 5 provided to cover the periphery of the terminal 7. In this case, the sheet-like intervening member 5 can be provided in an area relatively wide in the circumferential direction and the location of the terminal 7 that might cause the breakage of the heat shrinkage tube 6 can be reliably covered with the intervening member 5. Thus, the breakage of the heat shrinkage tube 6 can be more suppressed.

Further, in this embodiment, the intervening member 5 includes the fabric member. In this case, the breakage of the heat shrinkage tube 6 due to contact with the corner of the terminal 7 can be more suppressed by the relatively flexible and thick intervening member 5. Further, if the intervening member 5 is a fabric member containing acetate fibers, polyester fibers or the like, it can be suppressed that the intervening member 5 adversely affects the adhesive 4 and the water stopping performance of the terminal-equipped wire 100 can be stabilized.

Further, in this embodiment, the wire connecting portion 71 of the terminal 7 includes the coating connecting portion 712 configured to cover the periphery of the end part of the insulation coating 82 and be crimped to the end part of the insulation coating 82. Further, the heat shrinkage tube 6 covers the periphery of the intervening member 5 covering the periphery of the coating connecting portion 712. At this time, the coating connecting portion 712 is a part having a largest contour in the terminal 7 connected to the insulated wire 8. Accordingly, in a part of the heat shrinkage tube 6 covering the coating connecting portion 712, the heat shrinkage tube 6 is relatively stretched in the circumferential direction and has a smaller thickness as compared to other parts. Thus, the part of the heat shrinkage tube 6 covering the coating connecting portion 712 is easily broken when contacting a pointed location (corner part) of the terminal 7. In this embodiment, since the sheet-like intervening member 5 covers the periphery of the coating connecting portion 712 of the terminal 7, a load received by the contact of the heat shrinkage tube 6 with a corner of the coating connecting portion 712 can be suppressed by the intervening member 5 covering the corner parts of the terminal 7 and the breakage of the heat shrinkage tube 6 can be suppressed. Further, by providing the intervening member 5 only in the part having a relatively large contour, the breakage of the heat shrinkage tube 6 can be efficiently suppressed using a smaller amount of the intervening member 5.

Further, in this embodiment, the intervening member 5 has the two-layer structure including the first layer 51 formed of the fabric member and the second layer 52 containing the adhesive capable of bonding the first layer 51 to the terminal 7. In this case, since the state of the intervening member 5 wound around the insulated wire 8 and the terminal 7 is maintained by the second layer 52, operability in mounting the intervening member 5 on the terminal 7 and the insulated wire 8 is improved.

Second Embodiment

Figure 4:
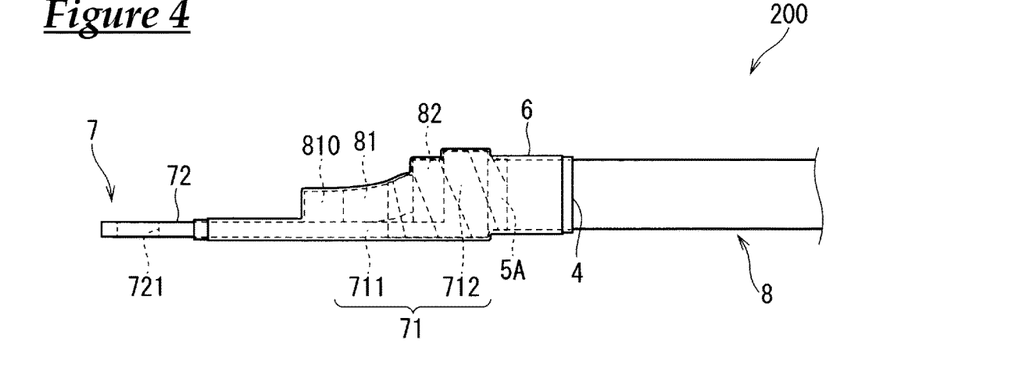
FIG. 4 is a side view of a terminal-equipped wire according to a second embodiment.
Figure 5:
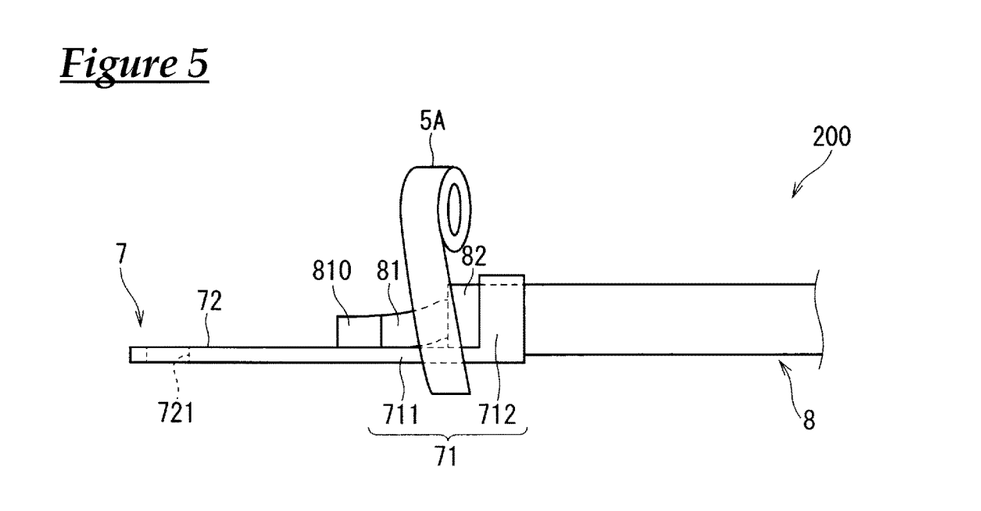
FIG. 5 is a side view showing a part of a manufacturing process of the terminal-equipped wire according to the second embodiment.

Next, a terminal-equipped wire 200 according to a second embodiment is described with reference to FIGS. 4 and 5. The terminal-equipped wire 200 includes an intervening member 5A different from that of the first embodiment. FIG. 4 is a side view of the terminal-equipped wire 200. FIG. 5 is a side view showing a part of a manufacturing process of the terminal-equipped wire 200. A state where the intervening member 5A is mounted on a terminal 7 and an insulated wire 8 is shown in FIG. 5. Note that, in FIGS. 4 and 5, the same constituent elements as those shown in FIGS. 1 to 3 are denoted by the same reference signs. Points of difference of this embodiment from the first embodiment are described below.

In this embodiment, the terminal-equipped wire 200 includes the insulated wire 8, the terminal 7, a heat shrinkable tube 6, an adhesive 4 and the intervening member 5A. The structures of the insulated wire 8, the terminal 7, the heat shrinkable tube 6 and the adhesive 4 in the terminal-equipped wire 200 are the same as in the first embodiment and, hence, are not described. Further, in this embodiment, the intervening member 5A covers a coating connecting portion 712 of a wire connecting portion 71 of the terminal 7 as in the first embodiment.

In this embodiment, the terminal-equipped wire 200 includes the sheet-like intervening member 5A spirally wound around the periphery of the coating connecting portion 712 of the wire connecting portion 71 of the terminal 7.

In this embodiment, the intervening member 5A is thought to be a tape-like member having an adhesive layer formed on an inner side. In this case, operability in mounting the intervening member 5A on the terminal 7 and the insulated wire 8 is improved. However, the intervening member 5A may be possibly a member having no adhesive layer formed on an inner side.

In this embodiment, as shown in FIG. 5, the intervening member 5A is spirally wound in an area of the terminal 7 including the coating connecting portion 712 of the wire connecting portion 71 after a connecting operation of the terminal 7 and the insulated wire 8. In this way, the intervening member 5A is mounted to cover the periphery of the coating connecting portion 712 of the wire connecting portion 71 of the terminal 7. In this state, the heat shrinkable tube 6 is mounted and shrunk, whereby the terminal-equipped wire 200 can be obtained.

Further, as shown in FIGS. 4 and 5, a state where the intervening member 5A is not wound in an area including a welded portion 810 is shown in this embodiment. However, the intervening member 5A may be possibly spirally wound also in the area including the welded portion 810 or in an area of the terminal 7 other than a contact portion 72.

Also in this embodiment, the breakage of the heat shrinkable tube 6 can be suppressed and the durability of a water stop structure by the heat shrinkable tube 6 in the terminal-equipped wire 200 can be improved by a simple operation of providing the sheet-like intervening member 5A at a location of the terminal 7 that might cause the breakage of the heat shrinkable tube 6.

Further, in this embodiment, the location of the terminal 7 that might cause the breakage of the heat shrinkable tube 6 can be more reliably covered with the intervening member 5A by spirally winding the intervening member 5A. Thus, the breakage of the heat shrinkable tube 6 can be more suppressed.

Third Embodiment

Figure 6:
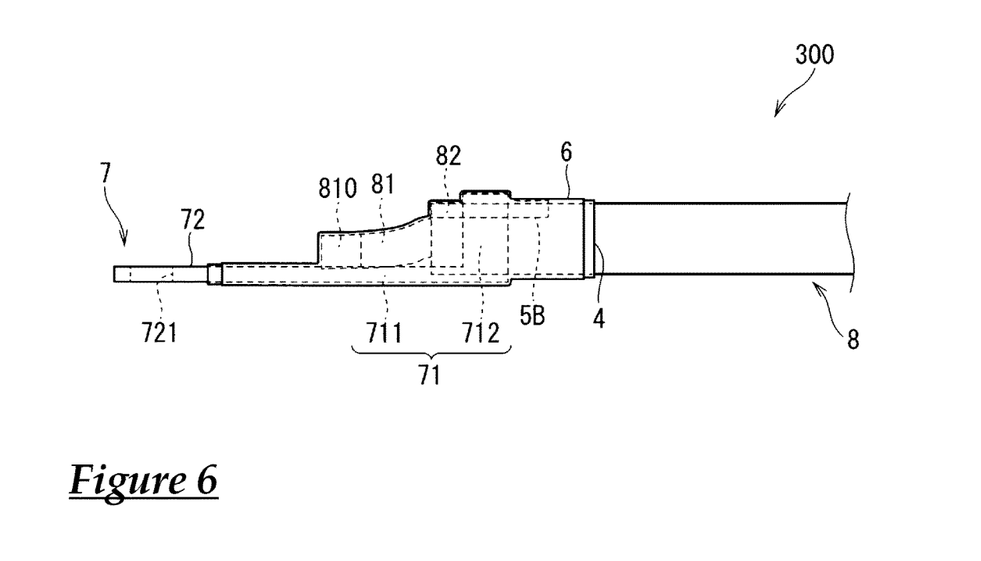
FIG. 6 is a side view of a terminal-equipped wire according to a third embodiment.
Figure 7:
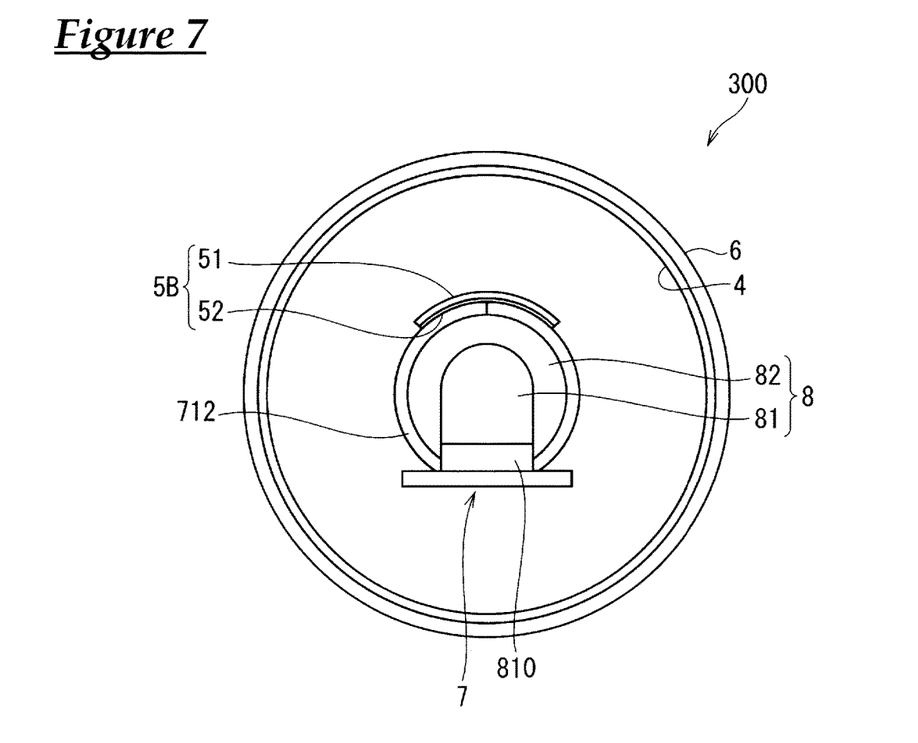
FIG. 7 is a partially exploded front view of the terminal-equipped wire according to the third embodiment.

Next, a terminal-equipped wire 300 according to a third embodiment is described with reference to FIGS. 6 and 7. The terminal-equipped wire 300 includes an intervening member 5B different from those of the first and second embodiments. FIG. 6 is a side view of the terminal-equipped wire 300. FIG. 7 is a partial exploded front view of the terminal-equipped wire 300. The terminal-equipped wire 300 in a state before the shrinkage of a heat shrinkable tube 6 is shown in FIG. 7. Note that, in FIGS. 6 and 7, the same constituent elements as those shown in FIGS. 1 to 5 are denoted by the same reference signs. Points of difference of this embodiment from the first and second embodiments are described below.

In this embodiment, the terminal-equipped wire 300 includes an insulated wire 8, a terminal 7, the heat shrinkable tube 6, an adhesive 4 and the intervening member 5B. The structures of the insulated wire 8, the terminal 7, the heat shrinkable tube 6 and the adhesive 4 in the terminal-equipped wire 300 are the same as in the first embodiment and, hence, are not described. Further, in this embodiment, the intervening member 5B covers a coating connecting portion 712 of a wire connecting portion 71 of the terminal 7 as in the first embodiment.

In this embodiment, the terminal-equipped wire 400 includes the sheet-like intervening member 5B provided to cover at least a partial area of the periphery of the coating connecting portion 712 of the wire connecting portion 71 of the terminal 7.

In this embodiment, the intervening member 5B is a seal-like member having a two-layer structure including a first layer 51 and a second layer 52. The intervening member 5B is attached to a location of the terminal 7 that might cause the breakage of the heat shrinkable tube 6 upon being contacted by the heat shrinkable tube 6. A case where the intervening member 5B is attached to cover a location where crimping pieces butt against each other in the coating connecting portion 712 of the terminal 7 is shown in this embodiment. However, the intervening member 5B may be possibly attached to a location other than the above one. For example, the intervening member 5B may be possibly attached to cover a welded portion 810 or attached to an end surface of the terminal 7.

Also in this embodiment, the breakage of the heat shrinkable tube 6 can be suppressed and the durability of a water stop structure by the heat shrinkable tube 6 in the terminal-equipped wire 300 can be improved by a simple operation of providing the sheet-like intervening member 5B at the location of the terminal 7 that might cause the breakage of the heat shrinkable tube 6.

Further, in this embodiment, the intervening member 5B is a seal-like member. Thus, the breakage of the heat shrinkable tube 6 can be suppressed by attaching the intervening member 5B only to the location that might cause the breakage of the heat shrinkable tube 6 and requires the covering with the intervening member 5B. Specifically, since the breakage of the heat shrinkable tube 6 can be suppressed by providing the intervening member 5B only at the necessary location, manufacturing cost of the terminal-equipped wire 300 can be suppressed.

Fourth Embodiment

Figure 8:
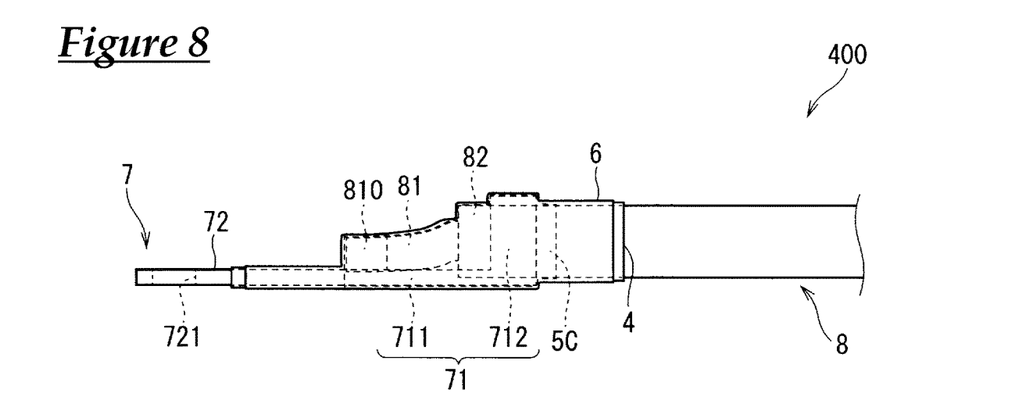
FIG. 8 is a side view of a terminal-equipped wire according to a fourth embodiment.
Figure 9:
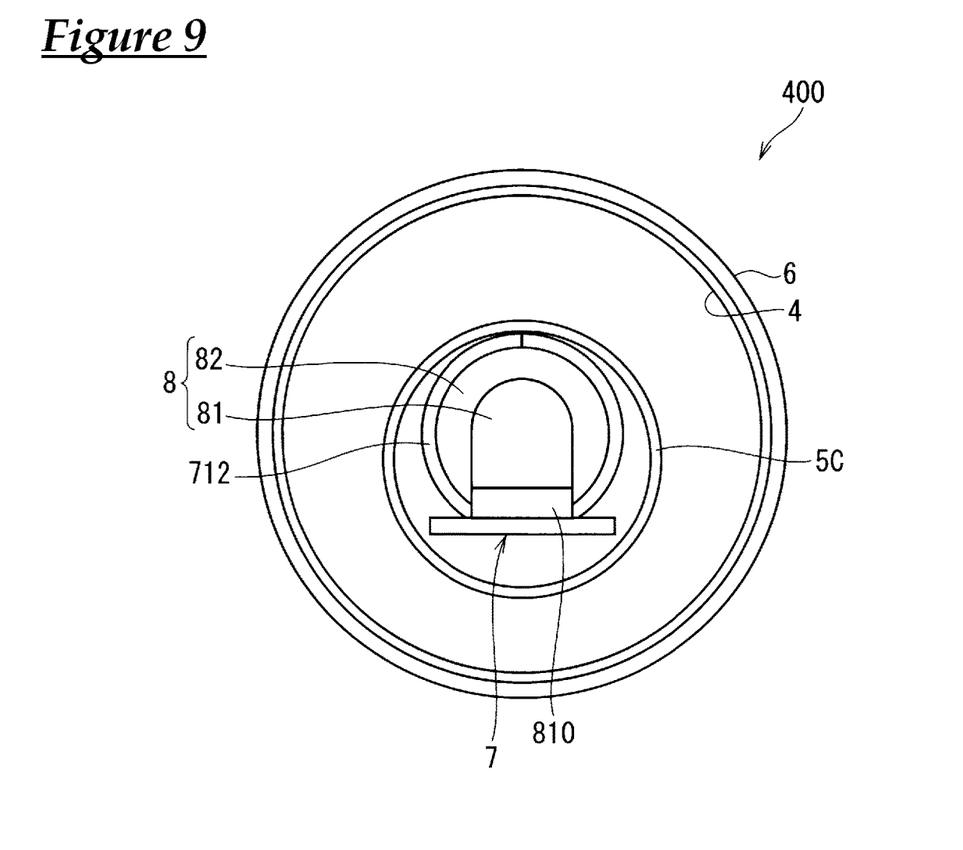
FIG. 9 is a partially exploded front view of the terminal-equipped wire according to the fourth embodiment.

Next, a terminal-equipped wire 400 according to a fourth embodiment is described with reference to FIGS. 8 and 9. The terminal-equipped wire 400 includes an intervening member 5C different from those of the first to third embodiments. FIG. 8 is a side view of the terminal-equipped wire 400. FIG. 9 is a partial exploded front view of the terminal-equipped wire 400. The terminal-equipped wire 400 in a state before the shrinkage of a heat shrinkable tube 6 is shown in FIG. 9. Note that, in FIGS. 8 and 9, the same constituent elements as those shown in FIGS. 1 to 7 are denoted by the same reference signs. Points of difference of this embodiment from the first to third embodiments are described below.

In this embodiment, the terminal-equipped wire 400 includes an insulated wire 8, a terminal 7, the heat shrinkable tube 6, an adhesive 4 and the intervening member 5C. The structures of the insulated wire 8, the terminal 7, the heat shrinkable tube 6 and the adhesive 4 in the terminal-equipped wire 400 are the same as in the first embodiment and, hence, are not described. Further, a case where the intervening member 5C covers a welded portion 810 besides a coating connecting portion 712 of a wire connecting portion 71 of the terminal 7 unlike the first to third embodiments is described in this embodiment. Note that, in this embodiment, the intervening member 5C is, of course, also thought to cover only the coating connecting portion 712 of the wire connecting portion 71 of the terminal 7 as in the first to third embodiments.

In this embodiment, the terminal-equipped wire 400 includes the sheet-like intervening member 5C provided to cover at least a partial area of the periphery of the coating connecting portion 712 of the wire connecting portion 71 of the terminal 7.

In this embodiment, the intervening member 5C is a sheet-like member bent into a tubular shape. Further, as shown in FIG. 9, the intervening member 5C includes no adhesive layer on an inner side in this embodiment.

Specifically, in this embodiment, the sheet-like intervening member 5C bent into a tubular shape is mounted on the terminal 7 and the insulated wire 8 in a state where the terminal 7 and the insulated wire 8 are connected. In this case, since the structure of the intervening member 5C is simple, manufacturing cost of the terminal-equipped wire 400 is suppressed. Note that the intervening member 5C may possibly include an adhesive layer on the inner side and be bonded to the terminal 7 and the insulated wire 8 by this adhesive layer.

In this embodiment, the intervening member 5C is first mounted to cover the periphery of the wire connecting portion 71 of the terminal 7 connected to the insulated wire 8. Then, by shrinking the heat shrinkable tube 6 before shrinkage covering the periphery of the intervening member 5C, the terminal-equipped wire 400 can be obtained.

Note that the intervening member 5C is bent into a cylindrical shape in an example shown in FIG. 9. However, the intervening member 5C may be possibly bent into a rectangular shape, a rectangular shape with rounded corners or the like. Further, the intervening member 5C may be possibly a sheet-like member bent into a tubular shape and having an inner side surface extending along the contours of the terminal 7 and the insulated wire 8.

Also in this embodiment, the breakage of the heat shrinkable tube 6 can be suppressed and the durability of a water stop structure by the heat shrinkable tube 6 in the terminal-equipped wire 400 can be improved by a simple operation of providing the sheet-like intervening member 5C at a location of the terminal 7 that might cause the breakage of the heat shrinkable tube 6.

Further, in this embodiment, the intervening member 5C is a sheet-like member bent into a tubular shape. Thus, the breakage of the heat shrinkable tube 6 can be suppressed by covering the location, which might cause the breakage of the heat shrinkable tube 6, with the intervening member 5. Further, the intervening member 5C mounted to collectively cover the terminal 7 and the insulated wire 8 is not detached from the terminal 7 and the insulated wire 8 by moving in a direction perpendicular to an extending direction of the insulated wire 8. This is because the intervening member 5C is a sheet-like member bent into a tubular shape to cover the terminal 7 and the insulated wire 8. In this case, the intervening member 5C needs not be provided with any adhesive layer and the structure thereof can be simplified. As a result, manufacturing cost of the terminal-equipped wire 400 can be suppressed.

In the first to fourth embodiments, the wire connecting portion 71 may possibly include no coating connecting portion 712. Specifically, the wire connecting portion 71 may possibly include only the core connecting portion 711.

Note that the terminal-equipped wire according to the present invention can be configured by freely combining the respective embodiments and application example described above or appropriately modifying or partially omitting the respective embodiments and application example within the scope of the invention as claimed.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

100 terminal-equipped wire
4 adhesive
5 intervening member
6 heat shrinkable tube
7 terminal
71 wire connecting portion
8 insulated wire

The invention claimed is:
1. A terminal-equipped wire, comprising:
   an insulated wire including a core and an insulation coating covering the periphery of the core;
   a terminal including a wire connecting portion connected to the insulated wire;
   a heat shrinkable tube configured to cover the periphery of the wire connecting portion while being shrunk by receiving heat; and
   a sheet-like intervening member provided between the heat shrinkable tube and the terminal.
2. The terminal-equipped wire of claim 1, further comprising an adhesive provided on an inner side of the heat shrinkable tube and configured to fill up clearances between the heat shrinkable tube and the terminal, the insulated wire.
3. The terminal-equipped wire of claim 1, wherein the sheet-like intervening member is provided to cover the periphery of the terminal.
4. The terminal-equipped wire of claim 1, wherein the intervening member includes a member made of fabric.
5. The terminal-equipped wire of claim 1, wherein:
   the wire connecting portion of the terminal includes a coating connecting portion configured to cover the periphery of an end part of the insulation coating and to be crimped to the end part of the insulation coating;
   the intervening member covers the periphery of the coating connecting portion; and
   the heat shrinkable tube covers the periphery of the intervening member covering the periphery of the coating connecting portion.

* * * * *